March 5, 1968
R. E. REICHARD
MEANS TO VARY TRAVEL FOR AN
OPERATOR-CONTROLLED LEVER
OR PEDAL
Filed July 15, 1966
3,371,485
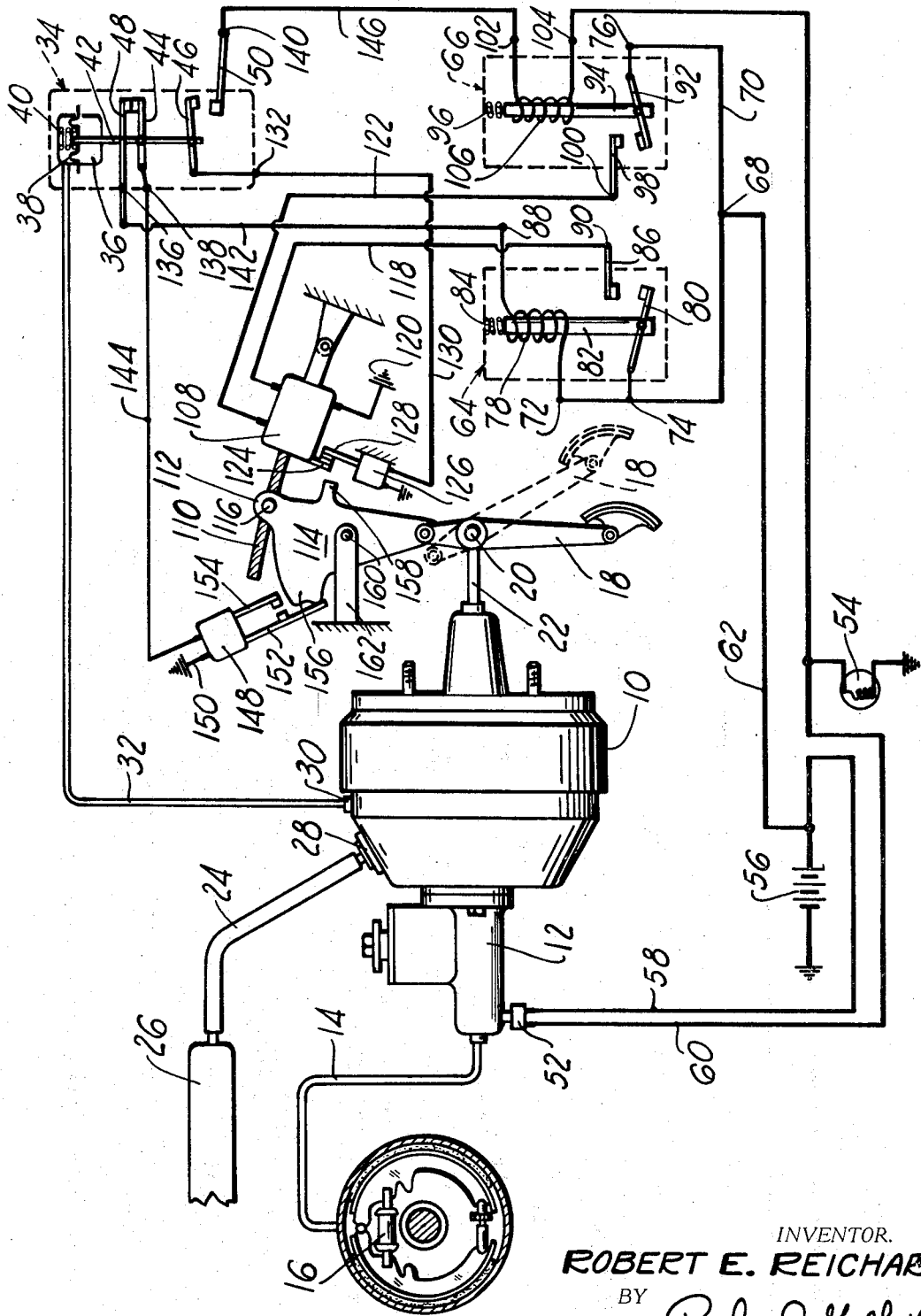
INVENTOR.
ROBERT E. REICHARD
BY
Richard G. Geib
ATTORNEY United States Patent Office 3,371,485
Patented Mar. 5, 1968

3,371,485
MEANS TO VARY TRAVEL FOR AN OPERATOR-CONTROLLED LEVER OR PEDAL
Robert E. Reichard, South Bend, Ind., assignor to The Bendix Corporation, a corporation of Delaware
Filed July 15, 1966, Ser. No. 565,492
8 Claims. (Cl. 60—54.5)

This invention relates to a means for positioning a fluid pressure servomotor control lever such as a brake pedal in a low minimum travel position or a high maximum travel position for power and manual actuation of a device such as a master cylinder operatively connected thereto. While I have shown my invention to be particularly applicable to fluid pressure operated brake systems, it should be realized by those skilled in the art to which the invention relates that it would be equally applicable to all fluid power systems where a limited travel of the brake pedal is all that is necessary for power actuation of a device, i.e., a master cylinder; whereas a greater travel is desirable for the manual actuation of the same device.

Reduced pedal travel is very important to manufacturers of motor vehicles, to enable the brakes to be applied with ease simply by pivoting the foot about the heel between the accelerator and the brake pedal. There are times, however, when due to lack of sufficient booster pressure or power, or other causes, full manual operation becomes necessary; as for example, when starting the engine of a car, or the latter is standing on a hill or slope without bothering to use the emergency brake, or in the case of a power failure. At such times, the driver or operator of a vehicle should be able to set the brakes by the same pedal, treadle or other manual member without necessitating any attention on the driver or operator's part other than to exert additional travel required for full manual braking, and such is an important object of the instant invention.

Another object of the invention is to provide a means for increasing the travel permissible by a brake pedal only after the brake pedal has been actuated so that a driver does not grope for the brake pedal when pivoting upon his heel from the accelerator to the brake pedal. In this regard, a subsidiary object of the invention is to enable the use of the means as a secondary power source in the event of a power failure to the primary servomotor controlled by the brake pedal.

It has been observed that in prior art devices of a similar nature heavy springs have been utilized to increase the travel of a brake pedal between its power application position and its manual application position, and it is still a further object of this invention to provide a means for increasing the travel for manual actuation of a brake pedal in accordance with the foregoing objects which does not involve heavy springs and the like.

It should also be noted that in prior art systems heretofore suggested that fluid pressure motors have been utilized to provide linear actuators for the increasing travel of a brake pedal which because of the mechanical advantage in most brake pedals of the modern day vehicle are of extreme size, and it is a still further detailed object of this invention to provide a motor means for varying the travel of a brake pedal of insignificant size and capable of developing the forces necessary to act as a secondary power source.

The foregoing and other objects and advantages will become apparent in light of the following description taken in conjunction with the accompanying drawings showing a schematic of a brake system embodying the principles of my invention.

In more detail, with reference to the drawing, there is shown a vacuum type fluid pressure servomotor 10 having a master cylinder 12 operatively connected thereto. The master cylinder is connected by means of a conduit 14 to a brake wheel cylinder 16, and a brake pedal 18 is pivotally connected as at 20 to a valve push rod 22 of the fluid pressure servomotor 10.

The fluid pressure servomotor 10 is connected by means of a conduit 24 to an intake manifold 26 for the vehicle. The conduit 24 enters the fluid pressure servomotor 10 via a check valve 28. An outlet port 30 is provided on the servomotor 10 to which a conduit 32 is connected to provide a reference vacuum supply pressure to a fluid pressure responsive switch 34.

More particularly, the fluid pressure responsive switch 34 includes a cylinder 36 having a diaphragm or pressure responsive member 38 therein biased by a spring 40 in opposition to the vacuum being fed thereto by means of the conduit 32. A force transmitting rod 42 is affixed to the diaphragm 38 and is pivotally connected to switch arms 44 and 46. The pressure responsive switch means 34 also includes a pair of fixed switch elements 48 and 50.

Another pressure responsive switch means in the form of a stoplight switch 52 is affixed to the master cylinder 12. This switch is of familiar type and is normally open in the absence of any pressure being created by the master cylinder 12 and closed by the creation of pressure therein so as to close the circuit to a stoplight shown, as at 54. It should be understood that the switch 52 may be within the conduit 14.

An electrical power source 56, such as a vehicle storage battery is connected by means of a lead 58 to the stoplight switch and a lead 60 from the stoplight switch will be connected to the lead 58 upon the closing of the switch 52 for actuation of the stoplight 54.

A lead 62 is connected to the lead 58 and is directed to a pair of solenoid switches 64 and 66. In more detail, the lead 62 is connected as at 68 to a manifold type lead 70 having terminals 72, 74 and 76. The terminals 72 and 74 are affixed to the solenoid switch 64 and lead internally thereof, respectively, to a coil 78 and a movable switch arm 80. The coil 78 is around a core 82 that is biased by means of a spring 84 to a downward position, and the movable switch element or switch arm 80 is pivotally connected to the core so that in its extreme downward position it is spaced from the fixed switch element 86. As seen, the solenoid switch 64 is also provided with terminals 88 and 90, respectively connected to the coil 78 and the switch arm 86.

The terminal 76 is placed on the solenoid switch 66 and is connected internally thereof to a movable switch arm 92 that is pivotally connected to a movable core 94 that is normally biased by means of a spring 96 to maintain the switch arm 92 spaced from a fixed switch arm 98. The solenoid switch 66 is also provided with terminals 100, 102 and 104. The terminal 100 is connected to the fixed switch arm 98, and the terminals 102 and 104 are connected to a coil 106 about the core 94. As seen, the lead 60 from the stoplight switch 52 is connected to the terminal 104.

A reversible motor 108 having forward and reverse windings, which are familiar to those skilled in the art is affixed in the vehicle. This motor is operatively connected to a screw or worm shaft 110 that operates within a pivoted nut or gear 112 that is connected by a plain or ball bearing race to a lever 114, as at 116.

From the terminal 90 of the solenoid switch 64 a lead 118 is connected to the reverse winding of the motor 108 and through the winding to a ground connection 120. From the terminal 100 of the solenoid switch 66 a lead 122 is connected to the forward winding of the motor 108 which is also connected to a switch terminal 124. An up limit switch 126, when closed, as will be hereinafter explained, completes the circuit to the forward winding whenever the switch terminal 124 is in engagement with another switch terminal 128 of the up limit switch 126. In addition a lead 130 is connected to the up limit switch 126 and is directed to a terminal 132 on the pressure responsive switch 34 that is internally connected within the switch 34 to the movable switch arm 46.

The pressure responsive switch 34 is also provided with terminals 136, 138 and 140 which are respectively connected to leads 142, 144 and 146. As seen, the lead 142 is also connected to the terminal 88 of the solenoid switch 64 and the lead 146 is connected to the terminal 102 of the solenoid switch 66. Lead 144, on the other hand, is connected to a down limit switch 148 which has a ground connection 150 and a pair of switch arms 152 and 154.

The lever or link, as it may be termed, 114 is provided with projections 156 and 158 for respectively controlling the switch arms 152 and 128 of the down limit switch and the up limit switch. The lever 114 is pivotally mounted as at 160 to a link 162 affixed to the vehicle structure.

In operation and during normal power braking operation, the brake pedal 18 is in the down position shown by the solid lines. The down limit switch 148 is open in that the projection 156 has forced the arm 152 to become separated from the arm 154. The high vacuum switch comprising the arms 44 and 48 is closed, and the low vacuum switch comprising the arms 46 and 50 is open. In this attitude the up limit switch 126 is closed and the solenoid switches 64 and 66 are not energized and the switch elements are open. Finally, the stoplight switch 52 is open.

When the operator of the vehicle depresses the brake pedal 18 to actuate the fluid pressure servomotor 10, and the vacuum within the servomotor as referenced by the conduit 32 in the cylinder 36 is below a predetermined amount, the spring 40 will move the rod 42 downwardly to open the high vacuum switch comprising arms 44 and 48 and close the low vacuum switch comprising arms 46 and 50. As pressure is developed by the master cylinder 12, the stoplight switch 52 closes thereby completing the circuit to the coil 106 via the ground connection through the up limit switch 126. This will close the switch elements 92 and 98 to energize the forward winding of the motor 108 and rotate the screw 110. This will pivot the lever 114 about the link 162 to the right, as viewed in the drawings, to raise the brake pedal 18 to the position shown by the dotted lines in the figure. As the pedal is being raised, the operator by maintaining force on it, will cause the motor 108 to power the push rod 22. In a design built, it was found that the operator could maintain the pedal with 50 lbs. of force and the motor 108 would develop about 300 p.s.i. in the line 14 before stalling and holding.

As the pedal reaches its maximum travel position, the projection 158 contacts the switch arm 128 to separate it from the arm 124 to open the circuit and stop the rotation of the motor 108. At this time the down limit switch 148, and more patricularly the switch elements 152 and 154 are closed completing the ground connection to the switch arm 44 of the pressure responsive switch 34. Therefore, upon restoration of vacuum in the servomotor 10 to cause the diaphragm 38 to compress the spring 40 and raise the rod 42, the switch element 48 again contacts the switch element 44 to close the circuit from the electrical power source 56 to the coil 78 and at the same time by opening switch elements 46 and 50 open the circuit to the coil 106. This will complete the circuit via the ground 120 to the reverse winding of the motor to counter rotate the screw 110 and pivot the lever 114 to the left until the projection 156 contacts the switch arm 152 to open the down limit switch 148 whereupon the actuation of the motor 108 ceases.

It should be realized that from the above description of operation, the brake pedal will not raise unless the operator's foot is actuating the brake system. However, the brake pedal will automatically lower it to its minimum travel position whenever sufficient vacuum is available in the servomotor 10. Therefore, the operator will not have to grope for the brake pedal when he brings his foot off of the accelerator as it will always be in its normal low attitude, i.e., about the height of the accelerator pedal, whenever a sufficient vacuum exists within the servomotor 10 to provide a biasing force for the diaphragm 38 on the spring 40 of the pressure responsive switch 34.

It will be obvious to those skilled in the art that the objects of the invention may be attained by constructions and arrangements differing in certain respects from those disclosed herein. The foregoing and other modifications are contemplated within the scope of the invention as defined by the appended claims.

I claim:

1. A means to position a brake pedal for short and long travel for power and manual actuation of a fluid pressure system, said means comprising:

a first switch means operatively connected to a power source, said first switch means including a pressure responsive member operatively biased by a spring to one position and by the power source to another position, a first switch mechanism operatively connected to said pressure responsive member so as to be normally closed so long as said power source has overcome said spring and a second switch mechanism operatively connected to said pressure responsive member so as to be normally open so long as said power source has overcome said spring;

a second switch means operatively connected to said fluid pressure system;

a reversible motor means including a first limit switch and a second limit switch respectively connected to said first switch mechanism and said second switch mechanism for controlling the maximum limit of actuation of said motor in either direction;

a first solenoid switch having a first coil around a spring biased core, a first fixed switch element and a first movable switch element with the latter operatively connected to said spring biased core;

a second solenoid switch having a second coil around a spring biased core, a second fixed switch element and a second movable switch element with the latter operatively connected to said spring biased core;

a means to operatively connect said first and second switch means, said reversible motor means and said first and second solenoid switches to an electrical power source to operate said motor; and a means for connecting said motor to said brake pedal including members arranged to operate said first and second limit switches to shut off said motor whenever said pedal is in its high or low travel position.

2. A means to position a brake pedal for short and long travel according to claim 1 and further characterized as including a fluid pressure servomotor operatively connected to a master cylinder and to said brake pedal such that the power source for said fluid pressure servomotor forms the power source for said pressure responsive member and the hydraulic pressure developed by said master cylinder operates said second switch means.

3. A means to position a brake pedal according to claim 1 wherein said reversible motor is characterized as a forward and reverse drive electrical motor and said means for connecting said motor to said brake pedal including a device for changing rotary motion to linear motion that is connected to a lever to which the brake pedal is pivotally suspended from a fixed support.

4. A means to position a brake pedal according to claim 3 wherein said lever comprises switch actuating projections and said lever is mounted between said first limit switch and said second limit switch so as to operatively engage said switches under the control of said motor to control the limit of actuation of said motor.

5. A means to position a brake pedal according to claim 1 and further comprising an indicator operatively connected to said second switch means to be actuated by development of pressure within said fluid pressure system.

6. In an operating mechanism having a manually operable member, a means to vary the position of said member from a normal position to a position permissive of greater travel, said means including:
- a lever having a first end and a second end;
- a means to connect said manually operable member to said first end of said lever;
- a reversible drive motor operatively connected to said other end of said lever; and
- an electrical system for controlling said reversible drive motor such that said manually operable member may be raised from a low position to a high position after the actuation thereof by an operator which include in combination pressure responsive switch means and solenoid actuated switch means plus limit switch means for stopping the reversible drive motor which limit switch means are operatively connected to said lever so as to be controlled thereby.

7. A brake system comprising:
- a fluid power source;
- a fluid pressure servometer operatively connected to said fluid power source;
- a brake means operatively connected to said fluid pressure servomotor;
- a first pressure responsive switch means operatively connected to said fluid power source via said fluid pressure servomotor, said fluid pressure switch means including a pressure responsive member operably biased by a spring to one position whenever said pressure reponsive member is above a predetermined value;
- a second pressure responsive switch means operatively connected to said brake means to be closed whenever said brake means is operated by said fluid pressure servomotor;
- a brake pedal for operatively controlling said fluid pressure servomotor;
- means for mounting said brake pedal including a pivotable link having forward and rearward projections;
- a motor means operatively connected to said link for positioning said brake pedal, said motor means including limit switches for limiting the actuation thereof that are operatively connected to said first pressure responsive switch means;
- first and second solenoid switch devices in circuit means with said first and second pressure responsive switch means and with said motor, said first solenoid switch means being operable whenever said first pressure responsive switch means senses an increase in fluid pressure and said second pressure responsive switch means is sensing the development of a pressure in said brake means, and said second solenoid switch means being operable whenever said first pressure responsive switch means is sensing a fluid pressure above a predetermined amount, so that said motor means is actuatable to raise said brake pedal only after fluid pressure is being developed for said brake means and fluid pressure from said fluid pressure power source has increased above a predetermined amount.

8. A brake mechanism comprising:
- a fluid pressure servomotor including a push rod;
- a first means pivotally connected to said push rod intermediate the ends of said means, one end of which is provided with an operator control member;
- a pivotally mounted second means having an end connected to the other end of said first means;
- a reversible motor having a means to change rotary motion to linear motion connected to said second means at another end thereof; and
- an actuating means for said motor sensitive to actuation of said push rod and pressure within said servo motor.

By a timing belt 58 to a motor pulley 60 driven by the output shaft 62 of a hydraulic motor 64. As apparent, rotation of the motor output shaft 62 causes rotation of the cross shaft 46 and consequent rotation, in opposite directions, of the fliers 18 and 20.

No References Cited.

MARTIN P. SCHWADRON, *Primary Examiner.*

C. B. DORITY, *Assistant Examiner.*

UNITED STATES PATENT OFFICE

CERTIFICATE OF CORRECTION

Patent No. 3,371,485                                    March 5, 1968

Robert E. Reichard

It is certified that error appears in the above identified patent and that said Letters Patent are hereby corrected as shown below:

Column 5, line 27, after "said" insert -- fluid pressure between said servomotor and said --. Column 6, lines 5 to 9, cancel "by a timing belt 58 to a motor pulley 60 driven by the output shaft 62 of a hydraulic motor 64. As apparent, rotation of the motor output shaft 62 causes rotation of the cross shaft 46 and consequent rotation, in opposite directions, of the fliers 18 and 20."

Signed and sealed this 18th day of November 1969.

(SEAL)
Attest:

Edward M. Fletcher, Jr.                         WILLIAM E. SCHUYLER, JR.
Attesting Officer                                    Commissioner of Patents